2,699,384

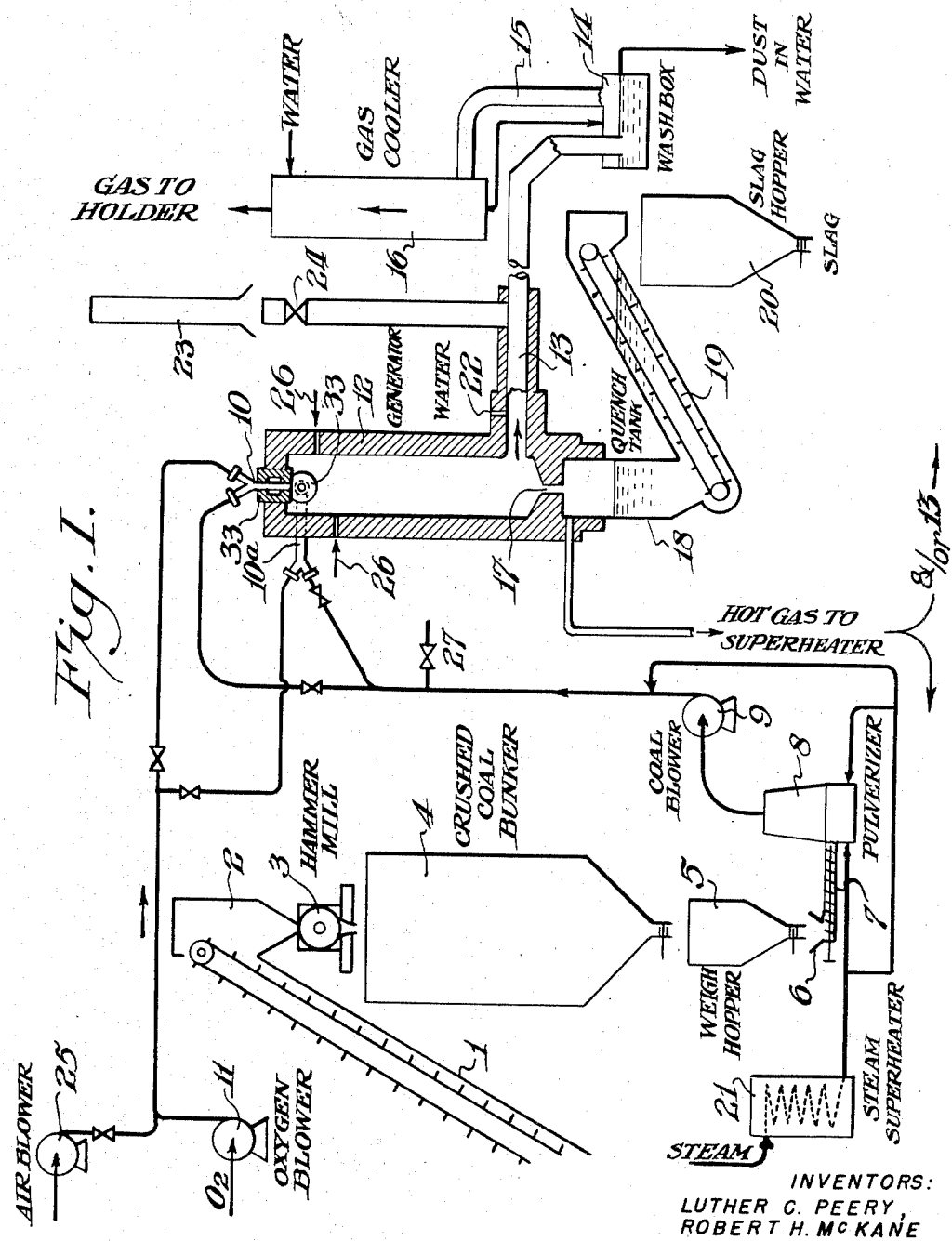

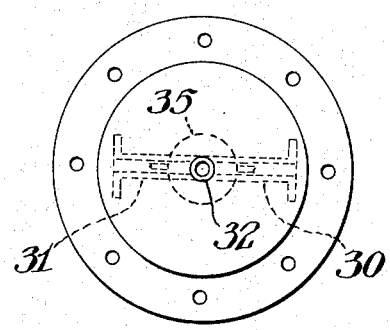
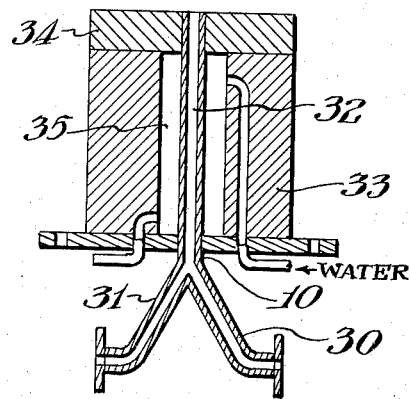
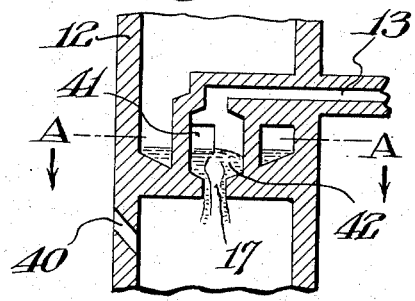
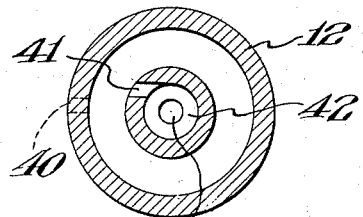
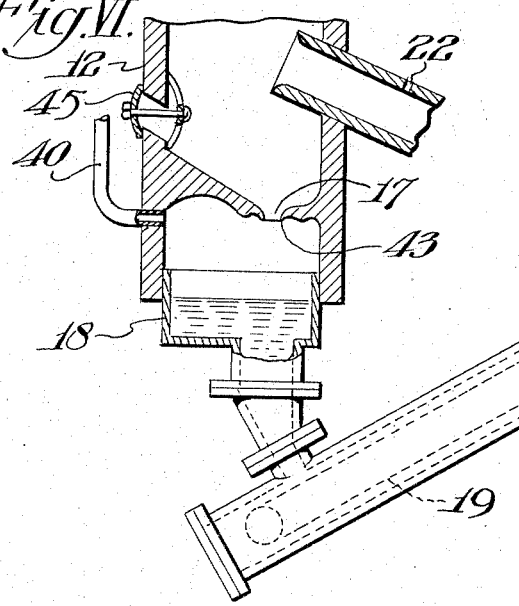
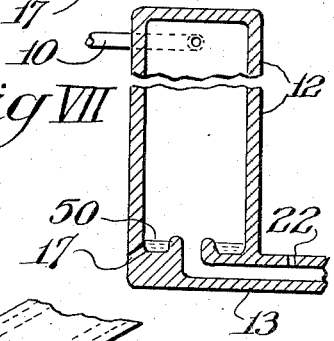
INVENTORS:
LUTHER C. PEERY,
ROBERT H. MCKANE
& DOUGLAS V. MOSES
ATTORNEY

United States Patent Office 2,699,384
Patented Jan. 11, 1955

PREPARATION OF CARBON MONOXIDE AND HYDROGEN FROM CARBONACEOUS SOLIDS

Luther C. Peery, Robert H. McKane, and Douglas V. Moses, Charleston, W. Va., assignors to E. I. du Pont de Nemours and Company, Wilmington, Del., a corporation of Delaware Application December 20, 1949, Serial No. 134,034

3 Claims. (Cl. 48—206)

This invention relates to a process for the preparation of carbon monoxide and hydrogen by at least partial oxidation of comminuted solid carbonaceous materials, and is more particularly directed to the preparation of hydrogen, gaseous mixtures containing hydrogen and nitrogen and gaseous mixtures containing hydrogen and carbon monoxide, by the partial oxidation of powdered coal. This application is in part a continuation of co-pending application S. N. 58,212, filed November 4, 1948.

Many methods have been proposed for the preparation of synthesis gases of the above compositions, although for all intents and purposes the basic source of these gases is coal, petroleum oils, or natural gas. Synthesis gases are derived from these sources by pyrolysis, the coal first is coked, then gasified and the petroleum hydrocarbons and natural gas cracked. Cracking of petroleum oils for their synthesis gas content is uneconomical and this route is used only for the utilization of by-product gases. In recent years, natural gas and gases high in hydrocarbon content have been cracked to produce synthesis gases or reacted in accord with the hydrocarbon steam reaction to give such gases. The availability, however, of hydrocarbon gases, whether natural or synthetic, have somewhat limited the extent of this source. Coal remains and will remain for some time the principal source, in spite of the very inefficient processes normally used for extracting gases from coal.

To realize its synthesis gas content, coal is usually subjected to destructive distillation in retorts, the distilled gas being subjected to purification for the recovery principally of its hydrogen and olefin content; untreated the product gas has value only for its B. t. u. content. The coke residue from the retorts remains the principal source of synthesis gases, the hydrogen and carbon monoxide being obtained from the coke by alternate heating with air and blasting with steam, the purified gases from the steam run being used in the synthesis of ammonia, alcohol and other organic compounds.

The coke oven route to the preparation of a synthesis gas is very wasteful of raw material and wasteful of the heat content of the coal. Processes have been proposed whereby such gases are derived directly from coal without passing through the crude destructive distillation processes. Only a single process, however, the Winkler process, operated for a short time on brown coal in Oppau, Germany, appears to have used this route commercially. This process involved introducing oxygen and steam into a fixed fluidized bed of fine fuel, the bed acting much like a liquid in the boiling state. The agitation of the particles within the bed was maintained by the flow of gases through the bed. Operation of such a process, however, is difficult for care must be exercised in the control of gas velocities to maintain the bed in a fluidized state, otherwise blow holes form and unreacted oxygen passes the bed causing explosions, rough operation and local damage. Difficulties and inefficiencies also arise from excessive fuel carry-over in the product gas. No commercially acceptable process, accordingly, is extant in the United States in which synthesis gases containing low inerts and low methane concentrations are produced directly from coal without passing through the costly destructive distillation step in coke ovens.

An object of the present invention is to provide an improved process for the preparation of synthesis gas mixtures from coal. Another object is to provide a process for the preparation of gases containing principally hydrogen, carbon monoxide and hydrogen, or hydrogen and nitrogen, wherein the purity and/or the ratio of constituents can be accurately controlled. A further object is to provide a process for the partial combustion of solid carbonaceous fuels, such as powdered coal, by a simple and highly efficient process. Yet another object is to provide a method of conducting such processes sealed from the atmosphere. Other objects and advantages of the invention will hereinafter appear, and will be more fully understood by reference to the specification and to the accompanying drawings which diagrammatically illustrate a preferred form and assemblage of apparatus in which the reaction takes place.

The instant application is directed principally to the sealing of the combustion generator from the atmosphere. One of the difficulties encountered in the partial combustion of pulverized coal is the discharge of the molten slag from the generator. In units described in the arts to investigate the process, little, if any, attention has been given to this feature, the molten slag being intermittently discharged from some manually operated opening provided in the bottom of the generator, some rodding or hoeing method being used to withdraw the slag. The discharging means, necessarily of a temporary nature, were given little serious attention, principal effort being expended in this involved problem on its chemical and economical aspects. However, for commercial adaptation of the process the discharge of molten slag involves a serious problem principally because the slag is discharged generally at about its freezing point and must be removed before solidification. Moreover, if the tapping hole through which the slag is dropped is relatively large, product gases will likewise be discharged via the same route and be lost through the mechanism used in removing the slag and/or the product gases be contaminated with air seeping into the generator.

This application, which is a modification of the parent application, ibid., more fully exemplifies the slag removal features of the process. One feature is directed to the removal of slag through a liquid seal. By means of this seal no valuable product gases are lost for the seal effectively separates the product gases from the atmosphere. Moreover, by use of the liquid seal, which may be under pressure, the combustion can be conducted under pressures up to 5 to 15 atmospheres or more.

This apparatus illustrated in the drawings may be used for the thermal partial decomposition by oxidation of hydrocarbonaceous solids generally and coal more particularly.

Fig. I illustrates the apparatus in which the process of the invention is carried out, and in which coal is pulverized, then suspended in superheated steam, which suspension is thoroughly mixed with oxygen, or oxygen fortified air, and the resulting mixture subjected to partial combustion. The gaseous products are separated from the slag and ash produced during the partial combustion of the powdered coal, and then are treated for the preparation of a gas of hydrogen, of hydrogen and carbon monoxide, or of hydrogen and nitrogen. Essentially all of the ash content of the coal is removed from the furnace as liquid slag. The series of operations illustrated provide an overall process for producing a highly efficient and economical conversion of the volatile matter and fixed carbon in coal, its oxidation products, together with decomposition products of steam to synthesis gas mixtures.

In Fig. I, conveyer 1 transports coal into hopper 2 of a hammer mill 3 wherein any lumps of coal are crushed. From hammer mill 3 the crushed coal drops into bunker 4, from the bottom of which in turn the crushed coal is fed by gravity to weighing hopper 5 and into the metering device 6 with screw feed 7, which forces a measured portion of the crushed coal into a steam pulverizer 8 wherein the crushed coal is comminuted and the product picked up by steam which transports it as a steam-coal fluid stream impelled by blower 9 into high velocity jet burner 10 or 10a, burner 10 being directed axially and downwardly into the gas generator 12, and burner 10a being directed tangently into the upper section of the generator 12. In burner 10 the steam-coal mixture is combined with oxygen of at least 90% purity which is forced into the burner by blower 11. The coal-steam-oxygen mixture issues from burner 10 into gas generator 12 in which the mixture of gases is ignited. The gaseous products of ignition flow from gas generator 12 through conduit 13 to wash box 14, the washed gases issuing from wash box 14 through conduit 15 and gas cooler 16 to a suitable gas holder not shown. The slag produced in gas generator 12 flows through a tapping hole 17 provided in the bottom of the gas generator 12 and drops into the water held in quench tank 18. The tapping hole 17 may, if desired, be located in the wall at the side rather than at the bottom of the generator 12 as shown, and may vary between about 1/50 to 1/100 of the furnace cross-section. The port of the tapping hole 17 is kept hot and free of slag plugs by withdrawing from about 10 to 25% of the product gas through this port. This hot gas may, if desired, be passed through the steam superheater 21 to preheat the entering steam and/or returned to the main product gas stream via an auxiliary blower not shown. From the bottom of quench tank 18 the slag is lifted by means of conveyer 19 to slag hopper 20. Steam is introduced into the system from superheater 21 from which it is passed into the pulverizer 8, and, if desired, may be introduced into the steam entrained coal after it passes blower 9. Cooling water is sprayed into the generator gases at 22 prior to passing them into the wash box 14. A flare stack 23 and valve 24 is provided for discharge of the gases produced during start-up, shut-down or control during periods of unsteady operation.

Figs. II and III illustrate, in detail, the construction of the high velocity jet burners 10 and 10a in which the steam-coal suspension from one arm 30 of the burner meets the oxygen from the other arm 31 in the mixing chamber 32. The material of construction of mixing chamber 32 is preferably stainless steel tubing or other metal resistant to high temperatures, chamber 32 being encased in castable fire brick refractories 33 and 34. A water jacket 35 on the mixing chamber 32 is desirable to prevent fusion of the tip when the hot furnace is shut down.

The hammer mill is adjusted to crush the lump coal to a size of ¼" or less, and this crushed coal is then dropped into the pulverizer 8 wherein it is ground to a product approximately 90% or more of which will pass through a 200 mesh U. S. standard screen. Any suitable type of mechanical pulverization may be used. The known commercial steam jet type pulverizers are especially well adapted for this particular operation because the pulverized coal after grinding is entrained in steam substantially at one and the same time, and passed from the pulverizer as a steam-coal fluid mixture, the coal being suspended by a sufficient quantity of steam flowing at a sufficient velocity to carry the coal to the burner.

One manner of removing the slag from converter 12 is illustrated in Figure 1. In the apparatus illustrated by this figure the slag falls by gravity through tapping hole 17 into a liquid, which may be water or any other suitable quenching medium, in quench tank 18. The molten slag, as it is quenched in the liquid, solidifies and is picked up by the conveyer 19 and discharged into the slag hopper 20.

Continuous flow of slag through tapping hole 17 is essential to successful operation of the process. Without some means of maintaining this flow by keeping this hole open, flow of the molten slag into conduit 13 may result in plugging of the apparatus. With many types of coal the temperature of the slag is close to its freezing point and there is a tendency to plug even with a slight lowering in temperature within the generator. Plugging, however, is avoided, as described, by passing a relatively small portion of the hot product gases through tapping hole 17 to maintain the slag passing through this aperture above its solidification temperature. The product gases may be removed from the free space above the quenching liquid and discharged into conduit 13, 15 or used for superheating steam or for any other desired purpose. Water, if used for quenching, is generally at its boiling point; considerable steam is formed and is withdrawn with the hot gases through the exit pipe 40.

Figure IV illustrates a modified product gas and slag separating unit situated at the bottom of the generator 12. The product gas flows down through generator 12 and through slot 41 into the slag discharge chamber 42. From this chamber the product gases rise and pass from generator 12 through conduit 13. Slot 41 discharges the product gas tangentially into chamber 42, the centrifugal force of which aids in removal of incandescent dust particles. The molten slag likewise flows into chamber 42 through the lower part of slot 41 catching the particles as they are forced outward and downward. Fig. V is a cross section at A—A of Fig. IV giving the positions more in detail of the slot in this type of apparatus. The slag, as in the detail shown in Fig. I, passes through tapping hole 17 with a portion of the product gas which is discharged from the generator 12 through conduit 40, the molten slag falling directly into the liquid in a quench tank such as that shown in Fig. I.

It is not essential that the tapping hole 13 be positioned on the center line of the generator but may be situated off center and preferably situated at the hottest part of the discharge end of the generator 12 to insure that the molten slag be discharged as a fluid.

There is a tendency for the molten slag, as it passes through the tapping hole 17 to solidify before it is quenched and to build up on the periphery of the tapping hole 17. This is due in part to radiation of heat to the quenching liquid. The relatively small ratio of molten slag radiating to the water is a feature of the invention that inhibits plugging. Lip 43, Fig. VI, also inhibits to a large extent solidification and build-up of slag around the hole. Lip 43 is constructed and mounted in such a way that it can be readily removed and replaced without materially disturbing the rest of the generator floor. A removal door 45 is provided to permit examination of the generator floor and, if necessary, permits rodding to break up undesirable slag formation.

The generator 12 is lined, as is also the floor 44, with a suitable type of fire brick.

To start the reaction, gas generator 12 and auxiliary piping are brought up to temperature by burning natural gas or other fuel introduced into the high velocity jet burner at 27. This fuel is mixed with oxygen or air and burned within the generator 12 until the generator reaches a uniform temperature of about 1000° C. to 1200° C. When this temperature has been attained, coal and steam is introduced into the fuel stream and the ratio of steam-coal suspension gradually increased over a period of about an hour, at the end of which time substantially all auxiliary fuel flow is cut off. Commencing operation in this manner minimizes explosion hazards in gas generator 12. During normal operation of the process, the temperature within the combustion zone is held above 1200° C. and preferably above 1400° C., the maximum temperature at the chamber wall being between 1300° and 1700° C., the temperature being adjusted inter alia by control of rates of oxygen and coal ingestion. Flash-back of the flame into the burner is avoided providing a high fluid velocity is maintained in the jet burner 10 at all times. This velocity should be 100 feet per second for nozzles having diameters up to ¾" with velocities of at least 150 feet per second and preferably above 300 feet per second for larger nozzles. During the start-up period and after the interior temperature of the generator 12 has reached 1200° C. and the fuel is slowly replaced by the steam-coal mixture, a complete replacement is effected without hazardous flash-back difficulties, if the proper velocities are maintained.

Figure VII illustrates diagrammatically and in cross-section another method of discharging the slag and the product gas from the generator 12. In this modification it is preferable to introduce the coal-steam-oxygen mixture tangentially into the generator 12 through the burner 10, the slag swirls spirally down into the annular space 50 surrounding the product gas exit 13, the slag being discharged through slag port 17 into a quenching tank similar to that illustrated in Figure I. By the tangential introduction of the coal-steam-oxygen mixture into the generator 12 the slag is driven centrifugally against the outer walls of the generator which is preferably circular and flows, out of intermingling contact with the product gases, into the annular space 50.

The partial combustion of the comminuted coal may be operated with either up-flow, down-flow or side-flow of the steam-coal-oxygen mixture into the gas generator 12. Down-flow, as illustrated, either in axial or tangential direction, is preferred since it has been found that the temperatures throughout the length of the furnace are more nearly equal when the flow is in this direction, while a very short, high temperature zone may be encountered in an up-flow operation. Slag removal problems are also minimized with down-flow operation.

The steam has a five-fold function to perform; first, to pulverize the coal in steam pulverizer; second, to transport the coal as an entrained stream from the pulverizer to the high velocity jet burner; third, to provide an incipient distillation of volatile material from the coal; fourth, to limit and control the reaction temperature; and fifth, to serve as a reactant in the process. It is essential that the coal-steam mixture be maintained after comminution above the dew point of its moisture content in order to prevent precipitation within the conduits leading to the high velocity jet burner. When operating at temperatures only slightly above the dew point, the optimum advantages of the process are not realized, for it has been found that if the steam temperature is increased to a temperature above that at which incipient distillation of volatile materials from the coal occurs, this distillation facilitates ignition and subsequent partial combustion of the coal. As is well known, most bituminous coals reach a plastic state at a temperature of about 400° C., in which state the coal is quite sticky and difficult to transport without clogging of equipment. As a consequence, the steam-coal stream is preferably maintained at a temperature between 200 and 400° C., and preferably between 250 and 350° C.

To insure sufficient steam to carry the coal, the amount of steam should range between 0.5 to 1.5 pounds per pound of coal, depending to a large extent upon the height necessary to carry and to lift the coal from the pulverizer to the burner and on the resultant velocities in the transport lines. The steam supplied to the pulverizer should be under a pressure between 80 and 150 p. s. i. g., and preferably between 100 and 110 p. s. i. g., the blowers 9, 11, and 25 operating to deliver fluids at pressures between 1.0 and 5.0 p. s. i. g. Auxiliary steam in excess of pulverizer requirements may be supplied, if desired, at low pressure between 5 and 10 p. s. i. g.

One of the outstanding features of the invention rests in the premixing of the steam-coal suspension with oxygen prior to partial combustion of the coal content of the mixture. Mixing chamber 32 is so designated, with respect to length and cross-sectional area, and the steam-coal suspension entering the chamber simultaneously with the oxygen at such velocities, that the combining fluids set up a high degree of turbulence within the chamber, whereby thorough and uniform mixing is accomplished. To attain this result the chamber should have a length of at least 25 chamber diameters.

The oxygen introduced into the burner should be of not appreciably less than 90% purity, preferably above 95% purity, and is used in sufficient amounts to give steam-oxygen mixtures containing from 25 to 50 (mol percent) oxygen, and preferably from 30 to 40 (mol percent) oxygen based on the steam-oxygen mixture. Many factors such as fuel compositions and relative proportions of coal and steam influence the amount of oxygen required. With constant steam and coal flows, an increase in oxygen over that stoichiometrically required decreases the hydrocarbon leakage, increases the furnace temperature and reduces the $H_2/CO$ ratio in the product gas. It has, likewise, been found that loss of heat through combustion chamber walls increases inordinately the excess oxygen requirement, and conversely preheating the inlet gas and powdered fuel decreases the oxygen requirement for maintaining the hydrocarbon leakage essentially at zero.

If desired, steam or nitrogen (as pure nitrogen or flue gas) may be introduced at any point such, for example, as through auxiliary inlet 26 into the ignited gas in the generator 12 in order to lower the combustion temperature and act to quench the product gases. If steam is introduced, it, at one and the same time, increases the hydrogen content of the gas due to the decomposition of steam in accord with the water gas reaction and the hydrocarbon steam reactions which take place. While the temperature is not optimum for these reactions, nevertheless, it appears that they do occur, even under these rather unfavorable conditions. Nitrogen may be introduced at such point to give a final nitrogen containing gas and also to cool the combustion gases. Whether the steam is introduced in a single stream with the powdered fuel or partially with the fuel and partially into the converter itself, the same overall ratio of steam to powdered fuel should be maintained. If desired, the product gas containing nitrogen can be produced by using air introduced by air blower 25 into the oxygen. The air diluted oxygen mixture is combined in the high velocity jet burner 10 with the steam-coal stream. To produce a product gas for use in the synthesis of ammonia, the oxygen is diluted with air in an amount sufficient to give a product gas containing a hydrogen to nitrogen ratio of about 3. Inasmuch as the nitrogen content of the air introduced on a weight basis is the same as that found in the product gas, simple stoichiometric calculations will determine the optimum ratio of air to coal to be employed to give the desired nitrogen content in the product gas, whether the nitrogen be introduced via air, flue gas, or other nitrogen carrier, or into whatever part of the system the nitrogen or nitrogen carrier gas is introduced. Some small amounts of nitrogen will at times be introduced with the commercial oxygen and hydrocarbonaceous fuel, and this, of course, should be considered in the calculations.

If steam is to be used to quench the product gas and increase the $H_2/CO$ ratio, it is preferably used in a steam to coal weight ratio ranging between 0.1 to about 1.0, and preferably between 0.2 and 0.5. This will decrease the furnace temperature at the point of steam addition, and likewise produce a gas containing a higher ratio of hydrogen to carbon monoxide.

In the table which follows preferred embodiments of the process of the invention are further exemplified. The combustion vessel used in operating in accord with the processes of the table comprises a furnace shell of three superimposed and lined cylindrical sheet steel sections bolted together each 3 feet high with a 30 inch outside diameter and an 8 inch inside diameter. The reaction zone had a refractory one inch inside lining of silicon carbide, a refractory four inch layer made of "Alfrax" alumina brick, and between this refractory and the steel shell a four inch layer of Armstrong A-25 insulating brick and a two-inch layer of "Firecrete" castable insulation. The burner jet consisted of a three-quarter inch stainless steel throat 32 with the arms 30 and 31 of the burner being constructed of one-half inch stainless steel pipe, pipe 32 being encased in a refractory 33.

The apparatus was operated at an average rate of about 1.6 to 1.9 pounds of powdered coal introduced per minute, with 190 to 230 standard cubic feet per minute of product gas produced per square foot of cross-sectional area, and a maximum throughput of about 250 cubic feet per minute per square foot. The inside refractory temperature averaged about 1500° C. at which temperature no refractory fusion occurred.

Table I

| Pds. of Powdered Coal/Hr. | Super-Heated Steam Temp., ° C. | $O_2$/Steam Mixture, Percent $O_2$ | Air, C. F. M. | Furnace Temp., ° C. | Product Gas in Volume Percent | | | | | |
|---|---|---|---|---|---|---|---|---|---|---|
| | | | | | $N_2$ | CO | $H_2$ | $CO_2$ | $CH_4$ | Ill. |
| 96 | 215 | 47.3 | | 1,550 | 2.5 | 43.7 | 33.6 | 19.6 | 0.4 | 0.2 |
| 96 | 200 | 50.2 | | 1,400 | 3.0 | 44.9 | 34.3 | 16.6 | 0.9 | 0.1 |
| 96 | 210 | 48.4 | | 1,520 | 2.4 | 47.8 | 29.0 | 20.6 | 0.2 | 0.3 |
| 96 | 265 | 47.0 | | 1,550 | 0.3 | 43.0 | 40.1 | 16.1 | 0.5 | 0.0 |
| 96 | 215 | 45.6 | | 1,550 | 2.4 | 43.4 | 33.7 | 20.2 | 0.3 | 0.0 |
| 114 | 240 | 35.7 | | 1,450 | 3.2 | 38.3 | 44.2 | 13.9 | 0.3 | 0.0 |
| 114 | 245 | 35.1 | | 1,375 | 3.3 | 35.1 | 46.5 | 14.9 | 0.2 | 0.0 |
| 114 | 240 | 37.0 | | 1,400 | 2.7 | 43.5 | 44.8 | 8.7 | 0.3 | 0.0 |
| 114 | 245 | 35.1 | | 1,375 | 3.6 | 35.9 | 44.6 | 15.6 | 0.3 | 0.0 |
| 60 | 240 | 36.0 | 11.5 | 1,400 | 18.5 | 32.9 | 33.9 | 13.0 | 1.6 | 0.1 |
| 60 | 250 | 35.7 | 15.5 | 1,400 | 26.6 | 27.0 | 36.7 | 8.8 | 0.2 | 0.7 |

The product gas obtained by the partial oxidation of the pulverized fuel may be used directly after its withdrawal from the gas cooler 16, or may be further treated in order to prepare it for use in the synthesis of methanol, in which a gaseous mixture of carbon monoxide and hydrogen is used; or to prepare it for use in the synthesis of ammonia, in which a gaseous mixture of carbon monoxide and hydrogen is used; or to prepare it for use in the synthesis of ammonia, in which a gaseous mixture of nitrogen and hydrogen is used; or to prepare it for use as a hydrogenation gas in which only its hydrogen content is used. Known methods may be used for treating the gaseous mixtures to give such synthesis gas mixtures or a process used such as that described in the copending application of L. C. Peery and R. H. McKane, S. N. 37,614, filed July 8, 1948.

We claim:

1. In a process for the preparation of carbon monoxide and hydrogen by the partial combustion of pulverized coal in the presence of steam and with oxygen of at least 90% purity wherein the slag is continuously discharged from the reaction zone in the molten state, the steps which comprise mixing pulverized coal with steam and oxygen of at least 90% purity, injecting the coal-steam-oxygen mixture into a combustion zone and subjecting it therein to partial combustion, sealing all openings of the combustion zone from the atmosphere, the inlet by the coal-steam-oxygen mixture, the product gas exit by the flow of product gases therethrough and the slag discharge exit by a water seal, adjusting and arranging said slag discharge exit and seal below the combustion zone to permit unobstructed flow of molten slag into said water seal, and discharging sufficient product gas through the slag discharge exit to keep that exit hot and free of slag plugs.

2. The process of claim 1 in which the slag exit port is 1/50 to 1/100 of the combustion zone cross-section.

3. In a process for the preparation of carbon monoxide and hydrogen by the partial combustion of pulverized coal in the presence of steam and with oxygen of at least 90% purity wherein the slag is continuously discharged from the reaction zone in the molten state, the steps which comprise mixing pulverized coal with steam to give a steam to coal ratio between 0.1 to about 1.0, thereafter mixing the resulting coal-steam mixture with oxygen of at least 90% purity, passing the coal-steam-oxygen composite mixture into a combustion zone and subjecting it therein to partial combustion, sealing all openings of the combustion zone from the atmosphere, the inlet by the coal-steam-oxygen mixture, the product gas exit by the flow of product gases therethrough and the slag discharge exit by a water seal, adjusting and arranging said slag discharge exit and seal below the combustion zone to permit unobstructed flow of molten slag into said water seal, and discharging sufficient product gas through the slag discharge exit to keep that exit hot and free of slag plugs.

References Cited in the file of this patent

UNITED STATES PATENTS

| Number | Name | Date |
|---|---|---|
| 909,920 | Marconnet | Jan. 19, 1909 |
| 1,146,627 | Koppers | July 13, 1915 |
| 1,799,885 | Chavanne | Apr. 7, 1931 |
| 1,833,964 | Cross | Dec. 1, 1931 |
| 2,558,746 | Gaucher | July 3, 1951 |

FOREIGN PATENTS

| Number | Country | Date |
|---|---|---|
| 201,147 | Great Britain | Jan. 3, 1924 |
| 413,130 | Great Britain | July 12, 1934 |

OTHER REFERENCES

Johnson et al., "Gasification of Coal," Office of Technical Services, PB80330, April 22, 1947, pages 2–4.